(12) United States Patent
Hoste et al.

(10) Patent No.: US 12,530,212 B2
(45) Date of Patent: Jan. 20, 2026

(54) METHOD AND APPARATUS FOR ISOLATED EXECUTION OF COMPUTER CODE WITH A NATIVE CODE PORTION

(71) Applicant: Nokia Solutions and Networks Oy, Espoo (FI)

(72) Inventors: Lode Hoste, Hove (BE); Tom Armand Van Cutsem, Kessel Lo (BE)

(73) Assignee: Nokia Solutions and Networks Oy, Espoo (FI)

( * ) Notice: Subject to any disclaimer, the term of this patent is extended or adjusted under 35 U.S.C. 154(b) by 156 days.

(21) Appl. No.: 17/882,653

(22) Filed: Aug. 8, 2022

(65) Prior Publication Data
US 2023/0086877 A1    Mar. 23, 2023

(30) Foreign Application Priority Data

Sep. 23, 2021 (EP) .................................. 21198660

(51) Int. Cl.
| | | |
|---|---|---|
| *G06F 9/455* | (2018.01) | |
| *G06F 9/445* | (2018.01) | |
| *G06F 9/54*  | (2006.01) | |

(52) U.S. Cl.
CPC ...... *G06F 9/45516* (2013.01); *G06F 9/44521* (2013.01); *G06F 9/546* (2013.01)

(58) Field of Classification Search
CPC ... G06F 9/45516; G06F 9/44521; G06F 9/546
See application file for complete search history.

(56) References Cited

U.S. PATENT DOCUMENTS

| | | | | |
|---|---|---|---|---|
| 7,634,578 B2* | 12/2009 | Pepin et al. | ............ | H04L 69/18 717/122 |
| 7,673,051 B2* | 3/2010 | Kaplan | ..................... | G06F 8/71 717/131 |
| 8,752,057 B1* | 6/2014 | Gould | ....................... | G06F 9/52 718/102 |
| 8,959,632 B2 | 2/2015 | Chen et al. | | |
| 9,471,353 B1 | 10/2016 | Christopher et al. | | |

(Continued)

OTHER PUBLICATIONS

Sharma et al., "Containers and Virtual Machines at Scale: A Comparative Study", published by ACM, Middleware'16, Dec. 12-16, 2016, Trento, Italy, pp. 1-13 (Year: 2016).*

(Continued)

*Primary Examiner* — S. Sough
*Assistant Examiner* — Selena Sabah Nahra
(74) *Attorney, Agent, or Firm* — Harness, Dickey & Pierce, P.L.C

(57) ABSTRACT

Example embodiments describe a computer-implemented method, comprising: i) receiving a request to execute a computer code for a tenant in an intra-process execution environment; ii) executing the computer code in a tenant-specific process when the computer code comprises a native code portion; ii) otherwise, executing the computer code in a global process or in the tenant-specific process. Wherein the tenant-specific process is configured to only execute computer codes associated with the same tenant in different intra-process execution environments, and the global process is configured to execute computer codes associated with different tenants in different isolated intra-process execution environments.

17 Claims, 5 Drawing Sheets

(56) References Cited

U.S. PATENT DOCUMENTS

| | | | | |
|---|---|---|---|---|
| 9,703,611 | B1* | 7/2017 | Christopher | G06F 9/5027 |
| 10,331,462 | B1* | 6/2019 | Varda | G06F 9/4484 |
| 10,860,430 | B2 | 12/2020 | Singhal et al. | |
| 11,385,921 | B2* | 7/2022 | Azeem | G06F 9/45558 |
| 2004/0015972 | A1* | 1/2004 | Barclay | G06F 9/45516 718/102 |
| 2011/0289479 | A1* | 11/2011 | Pletter | G06F 16/27 717/122 |
| 2016/0335431 | A1 | 11/2016 | Adams et al. | |
| 2019/0018953 | A1* | 1/2019 | Totale | G06F 21/53 |
| 2021/0109775 | A1* | 4/2021 | Shen | G06F 21/53 |
| 2023/0043503 | A1* | 2/2023 | Bradbury | H04L 9/0861 |

OTHER PUBLICATIONS

Wayback Machine FOLDOC "sandbox" definition (Year: 2010).*
"What is V8?", V8 JavaScript engine, Retrieved on Aug. 9, 2022, Webpage available at : https://v8.dev/.
"Cloud Computing without Containers", Cloudflare, Retrieved on Aug. 9, 2022, Webpage available at : https://blog.cloudflare.com/cloud-computing-without-containers/.
Madhavapeddy et al., "Unikernels: The Rise of the Virtual Library Operating System", Communications of the ACM, vol. 57, No. 1, Jan. 2014, pp. 61-69.
"Firing up the Ignition interpreter", V8, Retrieved on Aug. 9, 2022, Webpage available at : https://v8.dev/blog/ignition-interpreter.
"Digging into the TurboFan Jit", V8, Retrieved on Aug. 9, 2022, Webpage available at : https://v8.dev/blog/turbofan-jit.
"Design of V8 bindings", Chromium.Googlesource, Retrieved on Aug. 9, 2022, Webpage available at : https://chromium.googlesource.com/chromium/src/+/refs/heads/main/third_party/blink/renderer/bindings/core/v8/V8BindingDesign.md.
"Getting started with embedding V8", V8, Retrieved on Aug. 9, 2022, Webpage available at : https://v8.dev/docs/embed.
"Nodejs/Nan", Github, Retrieved on Aug. 9, 2022, Webpage available at : https://github.com/nodejs/nan.
"Patriksimek/Vm2", Github, Retrieved on Aug. 9, 2022, Webpage available at : https://github.com/patriksimek/vm2.
"Laverdet/Isolated-vm", Github, Retrieved on Aug. 9, 2022, Webpage available at :https://github.com/laverdet/isolated-vm.
"This is Fortum", Fortum, Retrieved on Aug. 9, 2022, Webpage available at :https://www.fortum.com/about-us/our-company.
"Revenue of the Vodafone Group in the United Kingdom (UK) from 2014 to 2021", Statista, Retrieved on Aug. 9, 2022, Webpage available at :https://www.statista.com/statistics/687625/vodafone-revenue-in-the-uk/.
"Introducing Kontainers", Kontain, Retrieved on Aug. 9, 2022, Webpage available at :https://kontain.app/.
"Offloading Tasks to Worker Threads with NativeScript", The NativeScript Blog, Retrieved on Aug. 9, 2022, Webpage available at :https://blog.nativescript.org/offloading-tasks-to-worker-threads-with-nativescript/.
"Native batch ingestion", Apache Druid, Retrieved on Aug. 9, 2022, Webpage available at :https://druid.apache.org/docs/latest/ingestion/native-batch.html.
Extended European Search Report received for corresponding European Patent Application No. 21198660.9, dated Mar. 1, 2022, 11 pages.
Siefers et al., "Robusta: Taming the native Beast of the JVM", Proceedings of the 17th ACM Conference on Computer and Communications Security, Oct. 4-8, 2010, pp. 201-211.
European Office Action dated Apr. 11, 2024 for corresponding European Patent Application No. 21198660.9.
European Notice of Intention to Grant dated Oct. 15, 2024 for corresponding European Patent Application No. 21198660.9.

* cited by examiner

METHOD AND APPARATUS FOR ISOLATED EXECUTION OF COMPUTER CODE WITH A NATIVE CODE PORTION

TECHNICAL FIELD

Various example embodiments relate to a method for isolated execution of computer code with a native code portion.

BACKGROUND

Some cloud computing providers provide services allowing secure execution of third-party code from various tenants on a shared compute infrastructure. A cloud computing platform then provides execution environments for execution of such third-party codes. Code from one tenant is prevented from accessing and/or modifying the code, data, and keys of other tenants. As such, the execution environments are isolated from one another.

Such isolated execution environments may be provided by virtual machine based isolation where code of different tenants runs in different virtual machines, or by container based isolation where code of different tenants runs in different containers within an operating system.

In intra-process based isolation, a single process provides a plurality of isolated execution environments each executing a third-party code. Code in such an intra-process execution environment cannot interfere with other code despite being executed within the same process. This may for example be achieved by preventing the code from requesting access to arbitrary memory or by interpreting pointers within a private address space.

In one specific example of intra-process based isolation the process is a runtime engine, e.g. a JavaScript engine, that interprets or executes different third-party codes, e.g. JavaScript code, in an isolated manner written for the runtime system.

SUMMARY

The scope of protection sought for various embodiments of the invention is set out by the independent claims. The embodiments and features described in this specification that do not fall within the scope of the independent claims, if any, are to be interpreted as examples useful for understanding various embodiments of the invention.

Amongst others, it is an object of embodiments of the invention to provide a solution capable of isolated execution of computer code with a native code portion in an intra-process execution environment.

This object is achieved, according to a first example aspect of the present disclosure, by a computer-implemented method as defined by claim 1, comprising:
  receiving a request to execute a computer code for a tenant in an intra-process execution environment;
  executing the computer code in a tenant-specific process when the computer code comprises a native code portion;
  otherwise, executing the computer code in a global process or in the tenant-specific process; and
wherein the tenant-specific process is configured to only execute computer codes associated with the same tenant in different intra-process execution environments, and the global process is configured to execute computer codes associated with different tenants in different isolated intra-process execution environments.

In response to a request, a computer code is executed for a tenant in an intra-process execution environment. The request may for example be triggered by an external event, e.g. an HTTP request, a database update, a remote procedure call, or an application-specific notification. The intra-process execution environment runs in a tenant-specific process or in a global process. A single global process and a single tenant-specific process can run one or more of such intra-process execution environments. Because the intra-process execution environments of the global process are isolated, the global process can securely execute computer code associated with different tenants when the code does not include a native code portion. A native code portion may for example be, amongst others, machine code or a code compiled from a low-level programming language such as C or C++. In the context of the present application, 'isolation' and 'secure execution' refer to preventing code executed on behalf of one tenant to access or modify the code or data of another tenant. Computer code executed in an isolated intra-process execution environment of the global process is thus prevented from accessing and/or modifying the code, data, and keys in other intra-process execution environments in the global process. As such, computer codes associated with different tenants can be executed securely in a single global process, without starting a single process for every tenant. It is thus an advantage that for computer code without a native code portion the limited start-up latency, resource overhead, and cost per tenant to execute computer code in isolated intra-process execution environments can be maintained.

Computer code comprising a native code portion is executed in a tenant-specific process. The tenant-specific process is associated with a single tenant, i.e. the tenant-specific process is configured to only execute computer code from one specific tenant. As a result, native code portions can be securely executed even if they break the isolation of the intra-process execution environment as the computer code remains sandboxed within the tenant-specific process. The tenant-specific process only includes information belonging to the same tenant and thus the executed computer code may not gain access to information belonging to other tenants.

It is thus an advantage that computer code with a native code portion can be securely executed while maintaining the limited runtime overhead of intra-process execution environments. It is a further advantage that computer code with substantially optimized operations can be executed securely, as execution of native code portions can be substantially efficient and fast. It is a further advantage that legacy code or computer code written in a low-level programming language can be executed securely in intra-process execution environments, without converting it to a high-level programming language that does not break the isolation of the intra-process execution environments. It is a further advantage that existing scheduling strategies, in particular for cloud computing platforms, can easily implement the method for isolated execution of computer code with a native code portion.

Computer code of a tenant without a native code portion can also be executed in the tenant-specific process associated with said tenant, in addition to the global process. In doing so, the running processes can be utilized more efficiently, thereby further reducing the runtime overhead. This has the advantage that it can further reduce the cost per tenant to execute computer code.

According to an example embodiment, the request may comprise a reference to the computer code. The computer code may for example be stored in a database when provided to a cloud computing provider or serverless computing provider by a tenant. The computer code may only be loaded into memory following a request to execute the computer code. As such, the reference to the computer code may for allow to identify and retrieve the computer code from the database, e.g. from a database server or a control server.

According to a further example embodiment, the request may further comprise input data for the computer code. The input data may be, amongst others, a parameter, a number, information, an identifier, and/or a key required to execute the computer code. The desired input data may depend on the computer code to be executed.

According to a further example embodiment, the computer code may comprise a scripted code portion and the global process may be configured to execute scripted code portions in the different isolated intra-process execution environments. The scripted code portion may be a piece of code written in a scripting language, e.g. JavaScript, Python, PHP, Perl, or Ruby. The scripted code portion may be directly interpreted from source code and translated into machine language by an interpreter at runtime, without requiring a compilation step. The global process may be configured to interpret and execute said scripted code portions in the different isolated intra-process execution environments.

According to a further example embodiment, the method may further comprise detecting the native code portion in the computer code. It may be unknown if the computer code comprises a native code portion. The computer code may thus be searched or checked for the presence of a native code portion. This detection may for example be performed when the computer code is provided to the cloud computing provider or serverless computing provider, when the computer code is loaded into memory, and/or when the computer code is executed.

According to a further example embodiment, the method may further comprise detecting a loading mechanism of the native code portion during execution of the computer code in the global process, interrupting the execution of the computer code in the global process, and reallocating the computer code to the tenant-specific process for execution. In other words, execution of the computer code in the global process can be interrupted when the computer code attempts to load a native code portion. The native code portion may for example be detected by intercepting the loading mechanism of the native code portion. In doing so, breaking the isolation of the different isolated intra-process execution environments in the global process can be prevented. The computer code may then be reallocated to the tenant-specific process for secure execution.

According to a further example embodiment, the method may further comprise detecting a loading mechanism of the native code portion during execution of the computer code in the global process, and converting the global process to the tenant-specific process, when the computer codes in the global process are associated with the same tenant. In other words, the global process may be converted to a tenant-specific process when the computer code attempts to load a native code portion and all the computer codes being executed in the global process belong to the same tenant. The native code portion may for example be detected by intercepting the loading mechanism of the native code portion. The computer code can thus be securely be executed in the global process as long as all computer code in the global process belongs to the same tenant. In doing so, execution of the computer code with the native code portion does not have to be interrupted or delayed. When a global process is converted to a tenant-specific process, a new global process may be initialized to execute computer codes associated to different tenants.

According to a further example embodiment, the received computer code may comprise a tag indicative for the presence of the native code portion, and wherein the method further comprises allocating the computer code to the tenant-specific process based on the tag for further execution. The computer code with the native code portion may for example be tagged by the tenant before providing it to the cloud computing provider or serverless computing provider. The tag can thus indicate that a computer code comprises a native code portion, thereby allowing to allocate the tagged computer code directly to the tenant-specific process. It is a further advantage that this can reduce the load on the global process, as it can prevent that execution of a computer code with a native code portion is interrupted and reallocated from a global process to a tenant-specific process.

According to a further example embodiment, the method may further comprise initialising the tenant-specific process. The tenant-specific process associated to a tenant may be unavailable, e.g. when detecting the native code portion or when receiving a tagged computer code with a known native code portion. In this case, a new tenant-specific process may be initialized. Alternatively, an additional tenant-specific process may be initialized for a tenant based on the utilization of the current tenant-specific process, e.g. when the computer codes with a native code portion to be executed for said tenant exceed the capacity of the current tenant-specific process.

According to a further example embodiment, the method may further comprise allocating the computer code to a tenant-specific queue for execution in the tenant-specific process. The tenant-specific queue may be associated with a tenant and a tenant-specific process. The tenant-specific queue may comprise a collection of computer codes of a single tenant, to be executed in a certain order in the associated tenant-specific process. Therefore, the tenant-specific process can be configured to repeatedly fetch and execute computer code from the associated tenant-specific queue. As such, allocating computer code to a tenant-specific queue can ensure that the computer code is executed in the associated tenant-specific process. The computer code may for example be allocated to the tenant-specific queue when receiving a request to execute a tagged computer code with a known native code portion, or when detecting a native code portion in the computer code.

According to a further example embodiment, the method may further comprise allocating the computer code to a global queue for execution in the global process. The global queue may comprise a collection of computer codes of different tenants, to be executed in a certain order in the global process. Therefore, the global process can be configured to repeatedly fetch and execute computer code from the global queue. A plurality of global processes may, but need not fetch and execute computer code from a single global queue. The computer code may be allocated to the global queue after receiving a request to execute computer code for which the presence of a native code portion is unknown. Alternatively, the computer code may be allocated to the global queue when the presence of a native code portion is known in the computer code but the tenant-specific queue is unavailable, or when the computer code does not include a native code portion.

According to a second example aspect, a computer program product is disclosed comprising computer-executable instructions for performing the following steps when the program is run on a computer:

receiving a request to execute a computer code for a tenant in an intra-process execution environment;

executing the computer code in a tenant-specific process when the computer code comprises a native code portion;

otherwise, executing the computer code in a global process or in the tenant-specific process; and wherein the tenant-specific process is configured to only execute computer codes associated with the same tenant in different intra-process execution environments, and the global process is configured to execute computer codes associated with different tenants in different isolated intra-process execution environments.

According to a third example aspect, a computer readable storage medium is disclosed comprising computer-executable instructions for performing the following steps when the program is run on a computer:

receiving a request to execute a computer code for a tenant in an intra-process execution environment;

executing the computer code in a tenant-specific process when the computer code comprises a native code portion;

otherwise, executing the computer code in a global process or in the tenant-specific process; and wherein the tenant-specific process is configured to only execute computer codes associated with the same tenant in different intra-process execution environments, and the global process is configured to execute computer codes associated with different tenants in different isolated intra-process execution environments.

According to a fourth example aspect, an apparatus is disclosed comprising means configured to perform:

receiving a request to execute a computer code for a tenant in an intra-process execution environment;

executing the computer code in a tenant-specific process when the computer code comprises a native code portion;

otherwise, executing the computer code in a global process or in the tenant-specific process; and wherein the tenant-specific process is configured to only execute computer codes associated with the same tenant in different intra-process execution environments, and the global process is configured to execute computer codes associated with different tenants in different isolated intra-process execution environments.

BRIEF DESCRIPTION OF THE DRAWINGS

Some example embodiments will now be described with reference to the accompanying drawings.

DETAILED DESCRIPTION OF EMBODIMENT(S)

Figure 1:
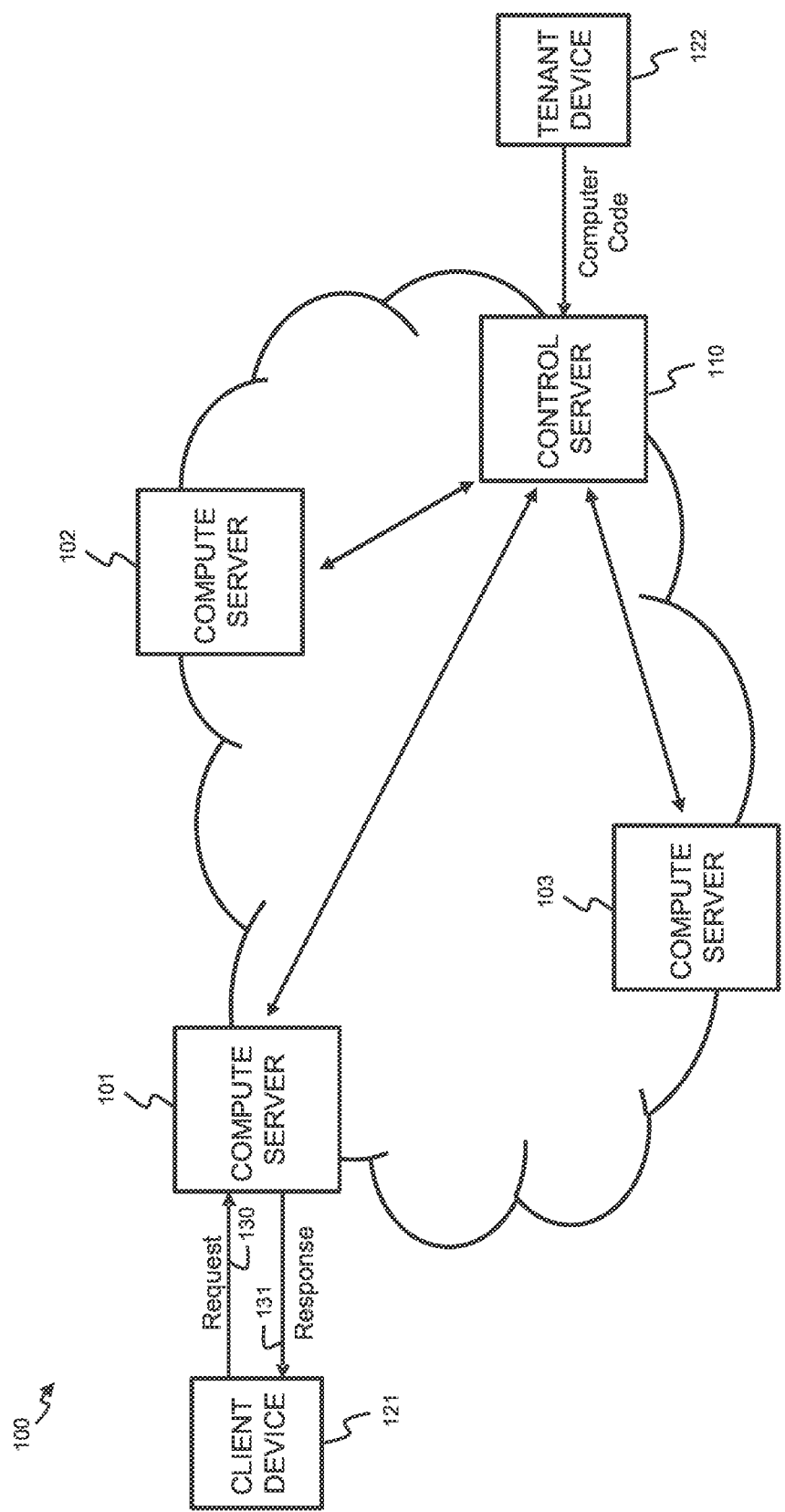
FIG. 1 shows an example embodiment of a cloud computing platform capable of isolated execution of computer code with a native code portion according to example embodiments.

FIG. 1 shows an example embodiment of a cloud computing platform 100 capable of isolated execution of computer code with a native code portion according to example embodiments of the disclosure. In such a cloud computing platform 100 different tenants can for example register one or more computer codes to be executed in response to a request 130. The request 130 to execute a computer code may be triggered by an external event such as for example, amongst others, an HTTP request, a database update, a remote procedure call, or an application-specific notification. The cloud computing platform 100 may comprise a plurality of compute servers 101, 102, 103 configured to execute the computer code for the tenant following the request. The computer code is executed in an intra-process execution environment of a single process. A compute server 101, 102, 103 may run a plurality of such single processes. Each single process may further run a plurality of intra-process execution environments. The intra-process execution environments may further be isolated from one another, i.e. code executed in a first intra-process execution environment cannot access or modify the code or data in another intra-process execution environment. The intra-process execution environment may for example be a JavaScript execution runtime built on the V8 JavaScript engine, in particular on the isolates concept from the V8 JavaScript engine.

The compute servers 101, 102, 103 may be physical servers that may, but need not be geographically distributed. The compute servers 101, 102, 103 may be part of a point of presence, PoP, that includes additional hardware such as for example, amongst others, other physical servers, data storage, database servers, computing devices, input/output devices, and network equipment (not shown in FIG. 1). The compute servers 101, 102, 103 may receive the request 130 to execute the computer code from a client device 121. The client device 121 may be a computing device such as for example, amongst others, a smartphone, a laptop, a desktop, a tablet, an Internet of Things, IoT, device, or a wearable device. Following the execution of the requested computer code, the compute server 101 may further be configured to communicate a response 131 to the client device 121 based on the output of the executed computer code.

The cloud computing platform 100 may further include a control server 110. The control server 110 may be configured to offer control services to the cloud computing platform such as for example, amongst others, receive a computer code from a tenant, configure the computer code to be executed in the cloud computing platform, determine on which compute server 101, 102, 103 to execute the computer code, and provide the computer code to the determined compute server 101, 102, 103. Alternatively, the control services can be provided by the cloud computing platform without a dedicated control server 110. A tenant device 122 may further communicate with the control server 110 to provide, i.e. upload, a computer code to be executed by the cloud computing platform 100. The tenant device 122 may be a computing device such as for example, amongst others, a smartphone, a laptop, a desktop, or a tablet.

The tenant may further specify the external event that triggers a request to execute the computer code such as for example, amongst others, an HTTP request, a database update, a remote procedure call, or an application-specific notification. Additionally, the tenant may indicate the presence of a native code portion in the provided computer code, thereby tagging the computer code. Such a native code portion may for example be, amongst others, machine code or a code compiled from a low-level programming language such as C or C++. It can be advantageous to execute such a native code portion when highly optimized operations are desired as the execution of native code may be relatively efficient and fast. It may further be advantageous to execute native code portions when legacy code is to be executed or an application programming interface, API, is written in a low-level programming language. This can have the advantage that the API or legacy code can be executed without converting it to a high-level programming language, e.g. a scripting language.

When executing computer codes for different tenants on a shared compute infrastructure, e.g. in a cloud computing platform 100, code executed on behalf of one tenant may be prevented to access or modify the code or data of another tenant. In other words, it may be desirable that computer codes are executed in an isolated manner.

Figure 2:
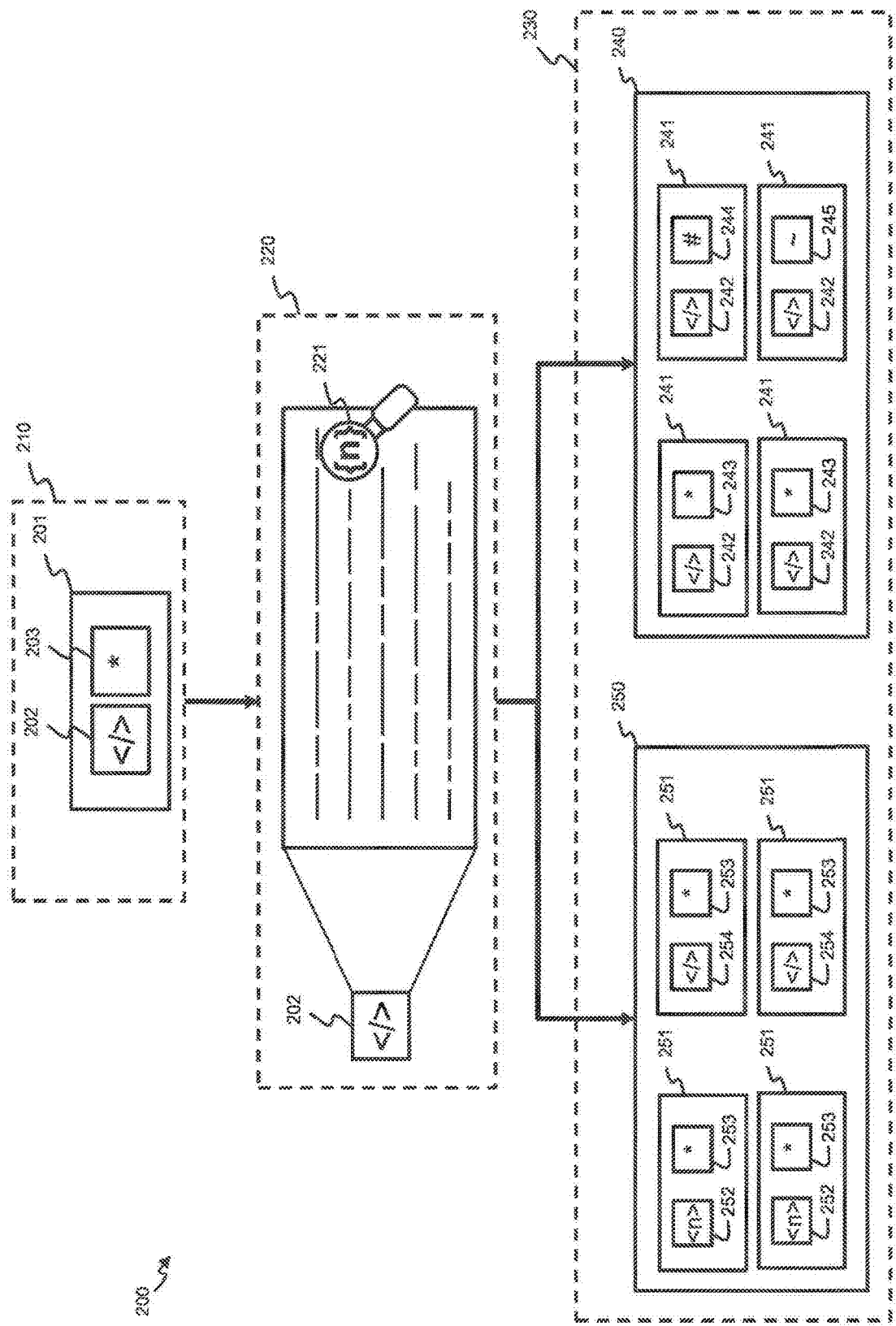
FIG. 2 shows steps of the computer-implemented method for isolated execution of computer code with a native code portion according to example embodiments.

FIG. 2 shows steps 200 of the computer-implemented method for isolated execution of computer code according to example embodiments of the present disclosure. In a first step 210, a request 201 is received to execute a computer code 202 for a tenant 203. The request may be received by a gateway module included in the compute server that executes the computer code, e.g. an HTTP request received by an API gateway. The request 201 may comprise a reference to the computer code 202 to be executed, a reference to the tenant 203 on behalf of whom the computer code 202 is to be executed, and input data (not shown in FIG. 2) to execute the computer code 202. The reference to the computer code 202 may allow the compute server to retrieve the desired computer code 202 from data storage or request the desired computer code 202 from a control server. The input data may be, amongst others, a parameter, a number, information, an identifier, and/or a key required to execute the computer code. The desired input data may further depend on the computer code to be executed. Alternatively, a computer code may be executed without input data.

The computer code 202 can for example be, amongst others, a piece of compiled code, machine code, scripted code, or a combination thereof. In other words, the computer code 202 can for example be a scripted code comprising a compiled code portion and/or machine code portion, i.e. a native code portion. The computer code 202 may for example respond to a request, e.g. an HTTP request. A scripted code or code portion may be a piece of code written in a scripting language such as for example, amongst others, JavaScript, Python, PHP, Perl, or Ruby. The scripted code portion may be directly interpreted from source code and translated into machine language by an interpreter at runtime, without requiring a compilation step.

In a second step 220, the presence of a native code portion 221 in the computer code 202 may be determined. According to example embodiments, the presence of a native code portion 221 may be detected for example, amongst others, when the computer code 202 is provided, i.e. uploaded, to the cloud computing provider, when the computer code 202 is loaded into memory, and/or when the computer code 202 is executed.

During a third step 230, the computer code 202 is executed in an intra-process execution environment 241, 251 running in a global process 240 or in a tenant-specific process 250, based on the presence of a native code portion 221 in the computer code 202. The computer code may for example be pushed or allocated to the global process 240 or the tenant-specific process 250 by means of a dispatcher.

The global process 240 is configured to execute computer codes 242 without a native code portion associated to different tenants 243, 244, 245. The computer codes are executed in different isolated intra-process execution environments 241 of the global process 240. The computer codes 242 can be executed securely thanks to the isolation properties of the intra-process execution environments 241. In other words, the isolated intra-process execution environments 241 of the global process 240 prevent the computer code executed therein from accessing and/or modifying the code, data, and keys in other intra-process execution environments 241 running in the same global process 240. As such, computer codes 242 associated with different tenants 243, 244, 245 can be executed in a single global process 240, i.e. without starting a single process for every different tenant 243, 244, 245. This can reduce start-up latency and resource overhead and has the advantage that it can reduce the cost per tenant to execute computer code 242.

The tenant-specific process 250 is configured to execute computer codes 252 with a native code portion associated with the same tenant 253 in different intra-process execution environments 251. The tenant-specific process 250 is associated with a single tenant 253, i.e. the tenant-specific process 250 is configured to only execute computer code belonging to a single specific tenant 253. In doing so, native code portions 221 can securely be executed even if the isolation of the intra-process execution environment 251 is broken, as the computer code 252 remains sandboxed in the tenant-specific process 250. As the tenant-specific process 250 only includes information belonging to the same tenant 253, information of other tenants can remain secure. The executed computer code 252 for tenant 253 can thus not gain access to information belonging to other tenants.

It is thus an advantage that computer code 252 with a native code portion can securely be executed while maintaining the limited runtime overhead of intra-process execution environments 251. It is a further advantage that computer code with substantially optimized operations can be executed securely, as execution of native code portions 221 can be substantially efficient and fast. It is a further advantage that legacy code or computer code written in a low-level programming language can be executed securely in intra-process execution environments 251, without converting it to a high-level programming language that does not break the isolation of the intra-process execution environments 251.

The tenant-specific process 250 is further configured to execute computer code 254 without a native code portion as long as the computer code 254 belongs to the tenant 253 associated to the tenant-specific process 250. In other words, the tenant-specific process 250 can execute computer code with 252 and without 254 a native code portion as long as they belong to the same tenant 253. This can offer more flexibility and efficiency when handling requests to execute computer code, as the running processes are utilized more efficiently. This has the advantage that the runtime overhead, e.g. memory overhead, start-up overhead, and context-switching overhead, can be reduced and the cost per tenant to execute computer code can be reduced.

Figure 3:
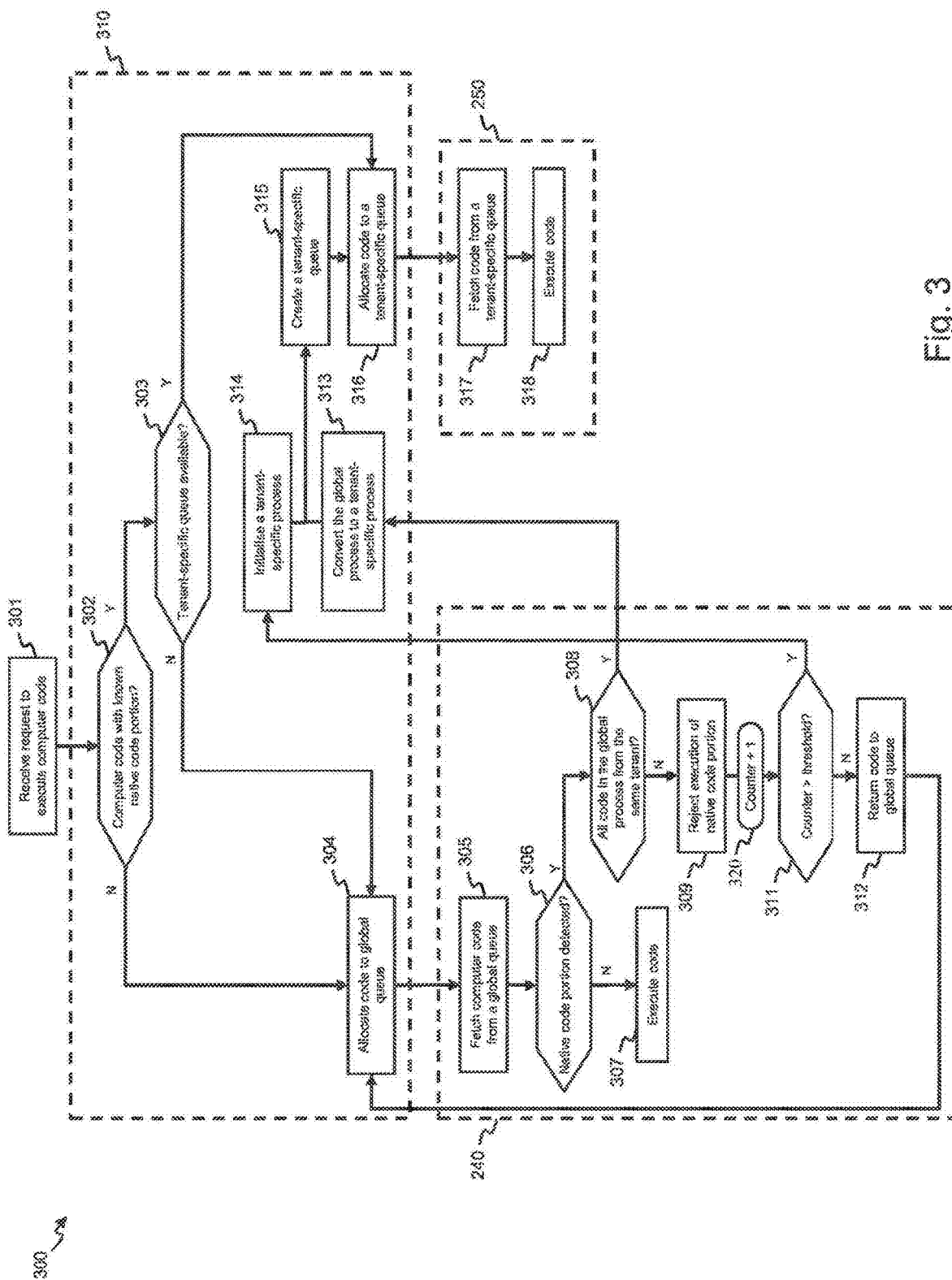
FIG. 3 shows steps for the isolated execution of computer code with and without a native code portion in intra-process execution environments according to an example embodiment.

FIG. 3 shows steps for the isolated execution of computer code with a native code portion in intra-process execution environments according to example embodiments of the present disclosure. In a first step 301, a dispatcher 310 may receive a request, e.g. from a gateway module, to execute a computer code for a tenant. The dispatcher may, in a second step 302, verify or check if the computer code to be executed comprises a known native code portion. A known native code portion refers to computer code for which the presence of a native code portion is known before execution. This may for example be the case when the computer code comprises a tag indicative for the presence of the native code portion. The computer code may for example be tagged by the tenant when providing it to the cloud computing provider, e.g. when uploading the computer code to the cloud computing platform. Alternatively, the computer code may be tagged when the native code portion is detected during execution or when the computer code is loaded into memory. Tagging a computer code when detecting a native code portion can thus prevent undesired repetition of the detection process when executing the same computer code at a later time. Such a tagged computer code can thus be allocated to a tenant-specific process more efficiently, i.e. without searching for a native code portion during consecutive evocations of the same computer code.

When the computer code comprises a known native code portion, e.g. the computer code is tagged, dispatcher 310 may verify in a next step 303 if a tenant-specific queue is available. The tenant-specific queue may be associated with a tenant and a tenant-specific process 250. The tenant-specific queue may comprise a collection of computer codes of a single tenant, to be executed in a certain order in the associated tenant-specific process 250. Therefore, the tenant-specific process 250 may repeatedly fetch and load computer code from the associated tenant-specific queue. As such, allocating computer code to a tenant-specific queue can ensure that the computer code is executed in the associated tenant-specific process 250.

When the presence of a native code portion in the computer code is unknown, or the tenant specific queue for a computer code with a known native code portion is unavailable, the dispatcher may push or allocate the computer code to a global queue in step 304. The global queue may comprise a collection of computer codes of different tenants, to be executed in a certain order in the global process 240. Therefore, the global process 240 may repeatedly fetch and load computer code from the global queue in step 305.

The next step 306 may include detecting the native code portion in the computer code. Thus, when fetching the computer code from the global queue and loading the code into memory, the computer code may be searched or scanned for the presence of a native code portion. This may for example be achieved by intercepting a loading mechanism, e.g. the 'require( )' function in JavaScript, and replacing this loading mechanism with a proxy function, i.e. a proxy loading mechanism. The proxy loading mechanism may perform substantially the same functions of the intercepted loading mechanism, in addition to detecting the presence of a native code portion. As such, existing scheduling strategies, in particular for cloud computing platforms, can easily implement the method for isolated execution of computer code with a native code portion.

When no native code portions have been detected, the computer code can securely be executed in the global process 240 in step 307. However, if a native code portion is detected in the computer code, step 308 may verify whether all the computer codes in the global process are associated with the same tenant. These codes include the computer code for which a native code portion is detected and all other computer codes currently being executed in the global process 240. If this is not the case, loading and execution of the computer code may be rejected or interrupted in step 309, as execution of the computer code with a native code portion can grant the code access to the other codes being executed in the global process 240 that belong to different tenants. In other words, executing the computer code with a native code portion in the global process 240 can break the isolation of the intra-process execution environments. As a next step 312, the rejected computer code may be returned to the global queue to be fetched again by a global process. This global process may, but need not be a different global process.

These steps 305, 306, 308, 312 are repeated until a suitable global process fetches the computer code with a native code portion, i.e. a global process that only comprises computer codes belonging to the same tenant. Such a suitable global process can be detected in step 308, whereafter the global process may be converted to a tenant-specific process in step 313. Converting the global process to a tenant-specific process may for example be performed by a dispatcher 310. Once the global process 240 is converted to a tenant-specific process 250, it may only execute computer code belonging to the same tenant. When a global process is converted to a tenant-specific process, the dispatcher may for example initialize a new global process to execute computer codes associated to different tenants, i.e. to replace the function of the converted process.

A counter may further be used to ensure that the rejected computer code can be executed within an acceptable timeframe, i.e. to prevent an endless loop when no suitable global process can be identified. The counter may be incremented 320 each time execution of the computer code is rejected in step 309. When the counter exceeds a predefined threshold 311, the dispatcher 310 can initialize a new tenant-specific process for the rejected computer code in step 314.

A tenant-specific queue may be created in step 315, following either the initialization of a new tenant-specific process 314 or the conversion of a suitable global process 313. Computer code comprising a native code portion may then be allocated to the created tenant-specific queue 316, to be fetched 317 and executed 318 by the associated tenant-specific process 250. Computer code may further be allocated 316 directly to the associated tenant-specific queue when said tenant-specific queue is available in step 303 for a computer code with a known native code portion.

Figure 4:
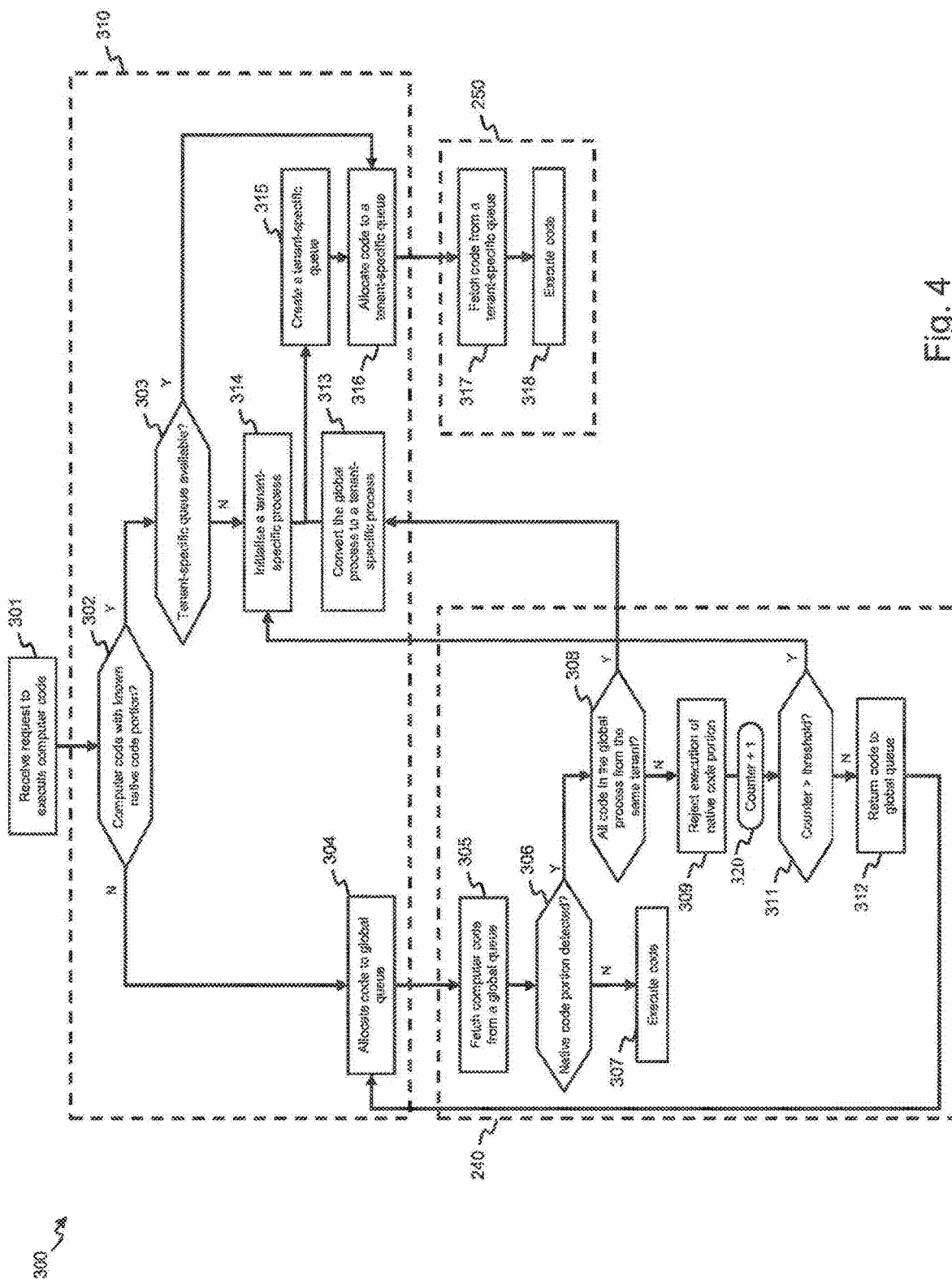
FIG. 4 shows steps for the isolated execution of computer code with and without a native code portion in intra-process execution environments according to another example embodiment.

FIG. 4 shows steps for the isolated execution of computer code with a native code portion in intra-process execution environments according to example embodiments of the present disclosure. Herein, a computer code with a known native code portion, determined in step 302, may trigger the dispatcher 310 to initialise a tenant-specific process 314 when the tenant-specific queue is unavailable 303. In doing so, the load on the global queue can be reduced compared to the example embodiments illustrated in FIG. 3 as computer code with a known native code portion may not be allocated to the global queue. It is a further advantage that the cloud computing provider may easily switch between the example embodiments illustrated in FIG. 3 and FIG. 4, depending on the scale and utilization of the cloud computing infrastructure.

Figure 5:
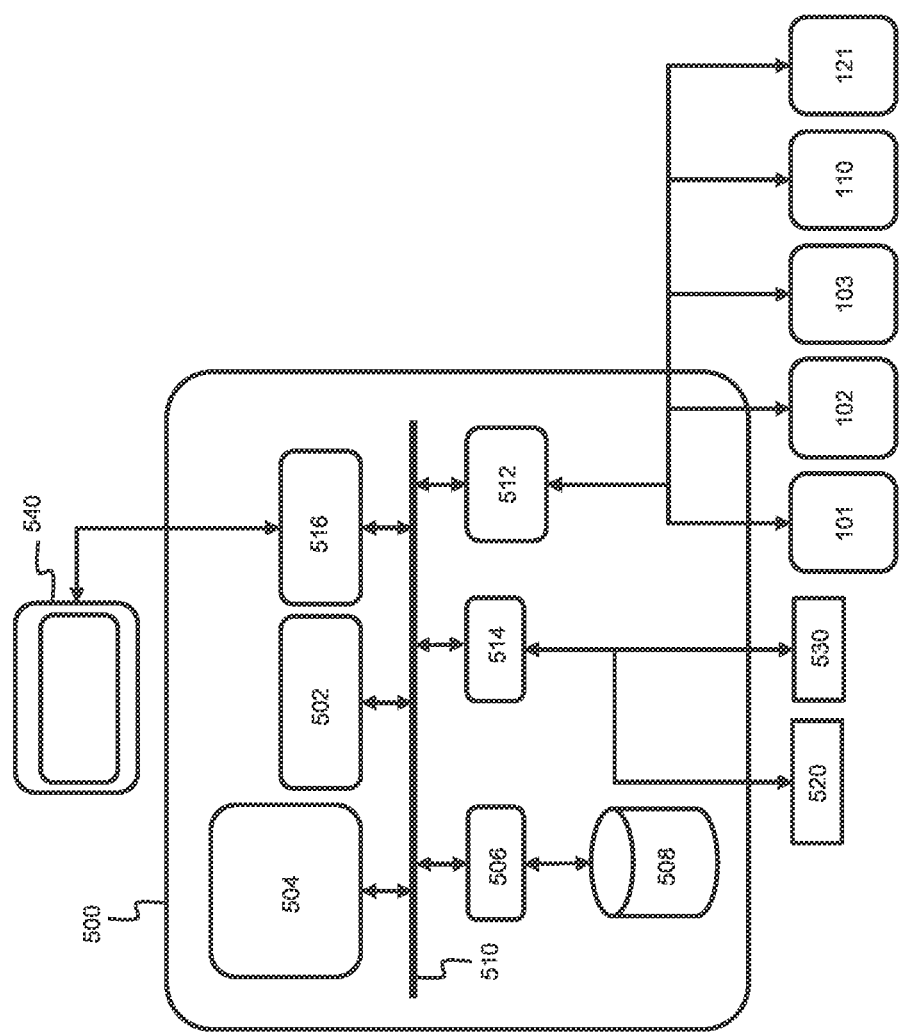
FIG. 5 shows an example embodiment of a suitable computing system 500 for performing one or several steps in embodiments of the disclosure.

FIG. 5 shows a suitable computing system 500 enabling to implement embodiments of the method for isolated execution of computer code with a native code portion in an intra-process execution environment. Computing system 500 may in general be formed as a suitable general-purpose computer and comprise a bus 510, a processor 502, a local memory 504, one or more optional input interfaces 514, one or more optional output interfaces 516, a communication interface 512, a storage element interface 506, and one or more storage elements 508. Bus 510 may comprise one or more conductors that permit communication among the components of the computing system 500. Processor 502 may include any type of conventional processor or microprocessor that interprets and executes programming instructions. Local memory 504 may include a random-access memory (RAM) or another type of dynamic storage device that stores information and instructions for execution by processor 502 and/or a read only memory (ROM) or another type of static storage device that stores static information and instructions for use by processor 502. Input interface 514 may comprise one or more conventional mechanisms that permit an operator or user to input information to the computing device 500, such as a keyboard 520, a mouse 530, a pen, voice recognition and/or biometric mechanisms, a camera, etc. Output interface 516 may comprise one or more conventional mechanisms that output information to the operator or user, such as a display 540, etc. Communication interface 512 may comprise any transceiver-like mechanism such as for example one or more Ethernet interfaces that enables computing system 500 to communicate with other devices and/or systems, for example with other computing devices 101, 102, 103, 110, 121. The communication interface 512 of computing system 500 may be connected to such another computing system by means of a local area network (LAN) or a wide area network (WAN) such as for example the internet. Storage element interface 506 may comprise a storage interface such as for example a Serial Advanced Technology Attachment (SATA) interface or a Small Computer System Interface (SCSI) for connecting bus 510 to one or more storage elements 508, such as one or more local disks, for example SATA disk drives, and control the reading and writing of data to and/or from these storage elements 508. Although the storage element(s) 508 above is/are described as a local disk, in general any other suitable computer-readable media such as a removable magnetic disk, optical storage media such as a CD or DVD, -ROM disk, solid state drives, flash memory cards, . . . could be used. Computing system 500 could thus correspond to the compute server 101, 102, or 103 according the embodiments illustrated by FIG. 1.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method comprising:
receiving a request to execute a computer code for a tenant in an intra-process execution environment;
executing the computer code in a tenant-specific process when the computer code comprises a native code portion, otherwise, executing the computer code in a global process; and
in response to the computer code being executed in the tenant-specific process, executing one other computer code in the tenant-specific process when the one other computer code does not comprise the native code portion and belongs to a tenant associated with the tenant-specific process,
wherein the tenant-specific process only executes computer codes associated with a same tenant in different intra-process execution environments isolated within the tenant-specific process, and the global process executes computer codes associated with different tenants in different isolated intra-process execution environments.

2. The computer-implemented method according to claim 1, wherein the request comprises a reference to the computer code.

3. The computer-implemented method according to claim 2, wherein the request further comprises input data for the computer code.

4. The computer-implemented method according to claim 1, wherein the computer code comprises a scripted code portion and wherein the global process executes scripted code portions in the different isolated intra-process execution environments.

5. The computer-implemented method according to claim 1, further comprising detecting the native code portion in the computer code.

6. The computer-implemented method according to claim 1, further comprising detecting a loading mechanism of the native code portion during execution of the computer code in the global process, interrupting the execution of the computer code in the global process, and reallocating the computer code to the tenant-specific process for execution.

7. The computer-implemented method according to claim 1, further comprising detecting a loading mechanism of the native code portion during execution of the computer code in the global process, and converting the global process to the tenant-specific process, when the computer codes in the global process are associated with the same tenant.

8. The computer-implemented method according to claim 1, wherein the received request comprises a tag indicative for a presence of the native code portion, and wherein the method further comprises allocating the computer code to the tenant-specific process based on the tag for further execution.

9. The computer-implemented method according to claim 1, further comprising initializing the tenant-specific process.

10. The computer-implemented method according to claim 1, further comprising allocating the computer code to a tenant-specific queue for execution in the tenant-specific process.

11. The computer-implemented method according to claim 1, further comprising allocating the computer code to a global queue for execution in the global process.

12. A non-transitory computer readable storage medium comprising computer executable instructions for performing the following steps when a program is run on a computer:
- receiving a request to execute a computer code for a tenant in an intra-process execution environment;
- executing the computer code in a tenant-specific process when the computer code comprises a native code portion, otherwise, executing the computer code in a global process; and
- in response to the computer code being executed in the tenant-specific process, executing one other computer code in the tenant-specific process when the one other computer code does not comprise the native code portion and belongs to a tenant associated with the tenant-specific process,
- wherein the tenant-specific process is configured to only execute computer codes associated with a same tenant in different intra-process execution environments isolated within the tenant-specific process, and the global process is configured to execute computer codes associated with different tenants in different isolated intra-process execution environments.

13. An apparatus comprising at least one processor and at least one memory storing instructions that, when executed by the at least one processor, cause the apparatus at least to perform:
- receiving a request to execute a computer code for a tenant in an intra-process execution environment;
- executing the computer code in a tenant-specific process when the computer code comprises a native code portion, otherwise, executing the computer code in a global process; and
- in response to the computer code being executed in the tenant-specific process, executing one other computer code in the tenant-specific process when the one other computer code does not comprise the native code portion and belongs to a tenant associated with the tenant-specific process,
- wherein the tenant-specific process is configured to only execute computer codes associated with a same tenant in different intra-process execution environments isolated within the tenant-specific process, and the global process is configured to execute computer codes associated with different tenants in different isolated intra-process execution environments.

14. The apparatus according to claim 13, wherein the request comprises a reference to the computer code.

15. The apparatus according to claim 14, wherein the request further comprises input data for the computer code.

16. The apparatus according to claim 13, wherein the computer code comprises a scripted code portion and wherein the global process is configured to execute scripted code portions in the different isolated intra-process execution environments.

17. The apparatus according to claim 13, wherein the apparatus is further caused to perform: detecting the native code portion in the computer code.

* * * * *